United States Patent [19]
Berti et al.

[11] Patent Number: 5,186,441
[45] Date of Patent: Feb. 16, 1993

[54] INTERNAL CENTERING DEVICE PARTICULARLY SUITABLE FOR CONNECTING THE ENDS OF TUBES

[75] Inventors: Dario Berti, Cassola; Giovanni A. Chiuppani, Bassano Del Grappa, both of Italy

[73] Assignee: AGIP S.p.A., Milan, Italy

[21] Appl. No.: 650,921

[22] Filed: Feb. 5, 1991

[30] Foreign Application Priority Data

Feb. 7, 1990 [IT] Italy ............................ 19281 A/90

[51] Int. Cl.$^5$ ............................................. B25B 1/20
[52] U.S. Cl. ....................................... 269/43; 269/48.1
[58] Field of Search ............... 269/43, 48.1; 279/2; 228/49.3, 44.5; 242/72, 72.1

[56] References Cited

U.S. PATENT DOCUMENTS

| | | | |
|---|---|---|---|
| 3,069,930 | 12/1962 | Stephenson | 269/48.1 |
| 3,498,518 | 3/1970 | Wheeler et al. | |
| 3,566,505 | 3/1971 | Martin | 228/49.3 |
| 3,858,846 | 1/1975 | Schmid | 254/29 A |
| 4,387,845 | 6/1983 | Mefferd | 269/48.1 |

FOREIGN PATENT DOCUMENTS

| | | | |
|---|---|---|---|
| 1240158 | 9/1959 | France | 269/48.1 |
| 2329401 | 5/1977 | France . | |
| 2165788 | 4/1986 | United Kingdom . | |

Primary Examiner—Robert C. Watson
Attorney, Agent, or Firm—Morgan & Finnegan

[57] ABSTRACT

An internal centering device which is particularly suitable for the connection of tube ends wherein there are fitted onto a central supporting member of mainly axial development two hollow mandrels of which at least one is adapted for axial movement and at least one is articulated on the said central body and is provided with at least three radial actuators which are disposed sufficiently remotely from the corresponding articulation, for angular positioning of the mandrel in relation to the said central body, each mandrel having an outer elastic sleeve which is capable of being radially expanded by an internal hydraulic axial actuator having two opposing threads. Also described are particular types of axial actuators as well as alternative embodiments.

4 Claims, 8 Drawing Sheets

INTERNAL CENTERING DEVICE PARTICULARLY SUITABLE FOR CONNECTING THE ENDS OF TUBES

The present invention relates to a new centering device which is particularly suitable for insertion into two abutting tubes in order that the ends thereof may be connected and which, being articulated, allows them a good five degrees of freedom, while being relatively simple and not very expensive to produce, as well as being highly reliable and easy to operate, permitting not only an effective recovery of the cross-sectional form of the abutting edges of the tubes to be connected but also an always perfect juxtaposition of the said edges by appropriate and now possible rotations and/or relative translatory movements of the two tubes.

It is well known that in many applications and particularly in the automatic welding of large diameter tube ends, a careful and accurate positioning of the abutting edges is generally required, together with a resumption of the shape of the said edges within reasonable tolerances.

Known within the state o the art are numerous devices for internally clamping the ends of tubes which are to be connected at their ends. The majority of these known devices relate to recovery of the cylindrical form of the abutting tube ends but do not make it possible to achieve a precisely coaxial relationship of the tubes or a perfectly coplanar relationship between the surfaces which are to be connected; many prior art devices act on the mutual proximity of the abutting edges but do not allow rotation and transverse displacement of the tube ends.

Finally, no known internal centering device is capable of imposing the cylindricity of the abutting edges while at the same time being articulated in such a way as to offer five degrees of freedom which are strictly necessary to guarantee that there is always a perfect juxtaposition of the ends of the tubes which are to be connected, and also making up for errors of shape due to normal working tolerances.

The object of the present invention is in fact that of avoiding the above-mentioned drawback and to provide an internal centering device which is relatively simple and not very expensive to produce, while being reliable and easy to operate, allowing displacement and perfect relative positioning of one tube in relation to another, even in the case of tubes which are howsoever axially offset and/or misaligned as well as the controlled radial deformation of the edge to be connected on each of the heads to be connected, in order to regain the form tolerances.

This is achieved substantially by producing the centering device with two hollow mandrels which can be expanded against the inside walls of the tubes to be connected, of which at least one is adapted for axial movement and at least one is articulated on a central support member disposed inside them and of mainly axial development, being provided with at least three radial actuators for moving and consequent angular positioning of the actual mandrel in relation to the said central member.

In fact, in such a simple embodiment the central member which is the structural element which supports the two mandrels inside which it is inserted, may now be easily produced in such a way as to resist also substantial external stresses such as those which may be transmitted between the tubes and furthermore its mainly axial development, making it possible to space the articulations of the mandrels sufficiently apart from each other and from the relative radial actuators, permits of any easy rotation or transverse displacement of one mandrel in respect of the other. Such complete possible freedom of movement combined with the accuracy generally afforded by the appropriately controlled radial actuators therefore guarantees an establishment of concentricity and the coplanar relationship of the roots of the edges of the tubes to be connected, within the required form tolerance, still with generous working tolerances in terms of the thickness of the tubes and the perpendicularity of the end edges however axially offset and/or misaligned the tubes themselves may be.

Furthermore, the aforesaid two hollow mandrels which may be positioned either symmetrically or in series on the said central support member each consist of an outer flexible sleeve of the elasticised type with a sleeve spring or a leaf or other type of spring and provided at its ends with expansion claws for radial clamping against the inside wall of the tube to be connected, by the action of a hydraulic axial internal actuator with two opposing threads and in turn constituted by a hollow body articulated at one end on the said central body and having close to the said end an annular projection which defines two annular actuating chambers having an annular jacket supported in axial sliding manner by the said hollow body and having at one end wedge-shaped expansion heads, the second of the said annular chambers being then bounded by a hollow stem which is also adapted to slide axially and is disposed concentrically inside the said jacket with which it also defines a third annular actuating chamber, the said stem being also supported by the said hollow body and having at its end which emerges from the said jacket wedge-shaped expansion heads, the said radial actuators being caused to act against the said central body and the above-mentioned end of the hollow stem or between the said central body and the said hollow body.

In this way, by supplying pressurised medium to the aforesaid two annular actuating chambers, not only is it possible to obtain an axial movement of the opposing threads in respect of the annular jacket and of the hollow stem of the hydraulic actuator of each mandrel of the internal centering device, of which the wedge-shaped heads so compel expansion of the claws of the resilient sleeve of the mandrels of the internal centering device against the inner surface of the tubes which are to be clamped and connected, overcoming the elastic reaction of the sleeves themselves, but the generous dimensioning which is now possible in respect of the particular shape of the internal centering device also permits of a more effective action of force by the claws against each tube and a consequently guaranteed resumption of the form of the abutting ends of the tubes which are to be connected. Furthermore, after correct clamping of the tubes by the hollow mandrels of the centering device, it is not possible also axially to position one tube which is to be connected in respect of the other tube by means of an axial or longitudinal displacement of the relative mandrel in relation to the central body of the centering device itself, which can easily be achieved by a transfer of fluid between the said two annular actuating chambers and more precisely by increasing the fluid in the said second annular chamber and correspondingly reducing the fluid in the other chamber: the said increase in fact taking place substantially between the said annular projection on the said hollow body and the said hollow stem, the said hollow body being articulated on the said central body of the centering device and therefore immovable, compelling the annular jacket and the hollow stem of the actuator and consequently the flexible sleeve of the hollow mandrel and the tube clamped thereon, to perform an axial displacement towards the other mandrel of the internal centering device. The disengagement of the mandrels from the relative tubes is then carried out by reducing the pressure in both the said two annular actuating chambers and increasing it in the said third annular actuating chamber defined by the annular jacket and the hollow stem of the internal actuator.

It is obvious then that if one of the two hollow mandrels of the internal centering device does not have to perform any axial displacement of the relative clamped tube, there will be a substantial simplification of its internal actuator in that according to another embodiment of the present invention, the said hollow body, articulated on the said central supporting member and having an annular projection, will now be rigid with the said hollow stem and form a single body whose said annular projection will define with the said annular displaceable jacket just two angular actuation chambers. More precisely, the internal axial actuator which is hydraulic and has two opposing threads for the axially immovable mandrel is according to the present invention constituted by a hollow body articulated at one end on the said central supporting member while at its other end it has wedge-shaped expansion heads and has an annular projection which defines two annular actuating chambers with an annular jacket supported so as to be axially displaceable on the said hollow body and having wedge-shaped expansion heads on its end which is close to the articulation of the said hollow body.

Another of the numerous advantages of the centering device according to the invention consists then of the fact that the particular hydraulic actuator with two opposing threads makes it possible to clamp the tubes and then to release the claws without any dragging effect and furthermore the well-profiled form in which it is possible to produce the outer surface of the centering device and more specifically the outer surface of the mandrels of the centering device facilitates insertion of the centering device into the tubes while the structural simplicity and reduced number of elements help to reduce costs and above all to increase reliability.

The invention will now be explained more clearly with reference to the appended drawings which illustrate preferred forms of embodiment which are given solely by way of example and which imply no limitation in that technical or structural alterations may be made to them at any time without thereby departing from the scope of the present invention.

Thus for example, the particular structural forms illustrated here are hypothesised and relate to the vertical assembly of tubes constituting the anchorage of a floating platform, in the interior of which the centering device is keyed by gravity but it is obvious that with simple additions, the same invention permits just as effective a connection between both inclined and horizontal tubes. Furthermore, in the configuration chosen for convenience of illustration, the radial actuators are caused to act between the central supporting body and the hollow stem and the relative actuating chambers are made in the said hollow stem but the said actuators could equally well also act between the central supporting body and the hollow body and consequently the relative actuating chambers could be provided either in the hollow body or actually in the central supporting body.

Furthermore, it should be pointed out that for simplicity of illustration the hydraulic means of supplying and controlling the fluids and the other complementary devices such as the sensors, the position and pressure transducers and the various electrical and electronic devices which are synthesised into one single hydraulic central unit have not been shown in the drawings because such devices are well known and do not constitute innovative elements of the invention. Similarly, for simplicity of illustration, the articulations between the central supporting body and the hollow body of the axial actuator are shown in the form of a sphere but any other arrangement among the many known in the state of the art may be used in order to permit rotation of the mandrel in relation to the central supporting body.

In the drawings:

FIG. 3 shows the positioning of the centering device inside the tubes which are to be connected;

FIG. 4 shows the clamping of the hollow mandrels of the centering device against the inside walls of the tubes which are to be connected, with restoration of the cylindrical form of the abutting edges of the said tubes;

FIG. 5 shows the phase of rotation and relative transverse displacement of the tubes to be connected;

FIG. 6 shows the relative axial displacement of the tubes to be connected;

Figure 8:
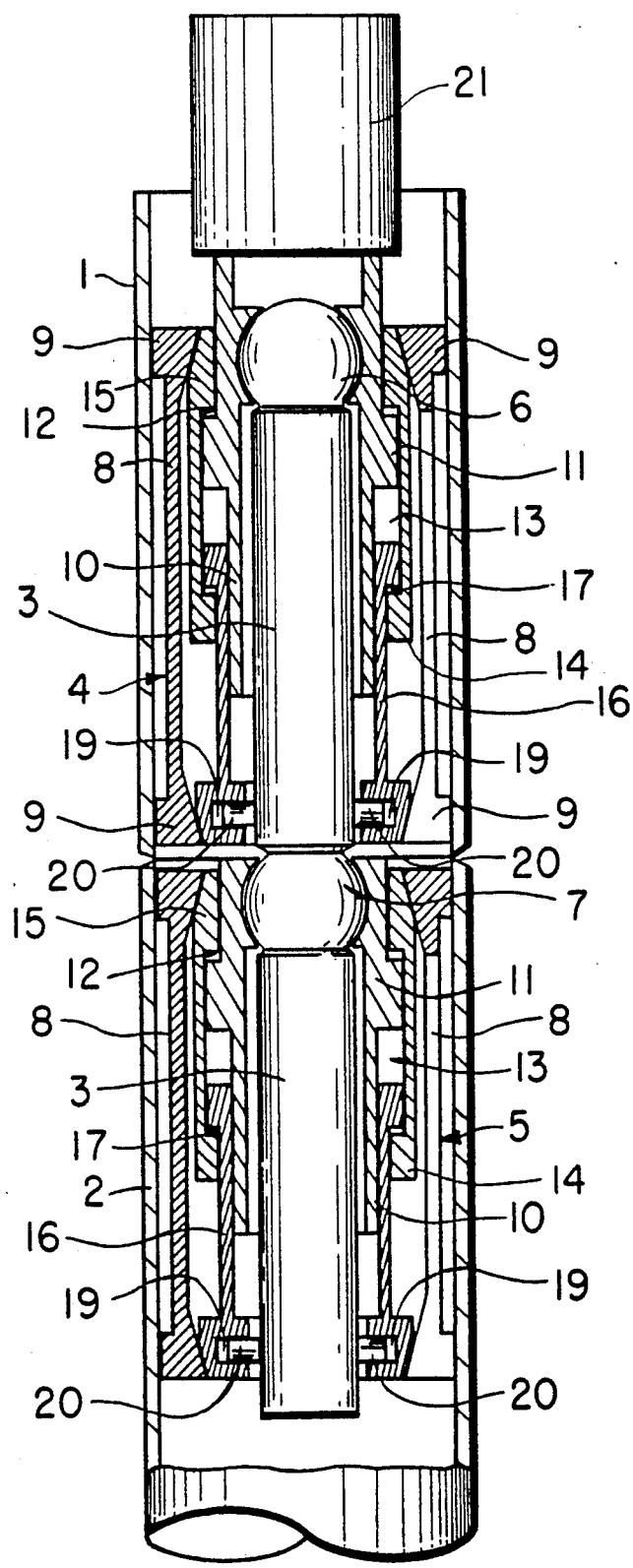
FIG. 8 is a longitudinal sectional view of another embodiment of the centering device according to the invention in which two hollow mandrels are disposed in series on the central supporting body.
Figure 9:
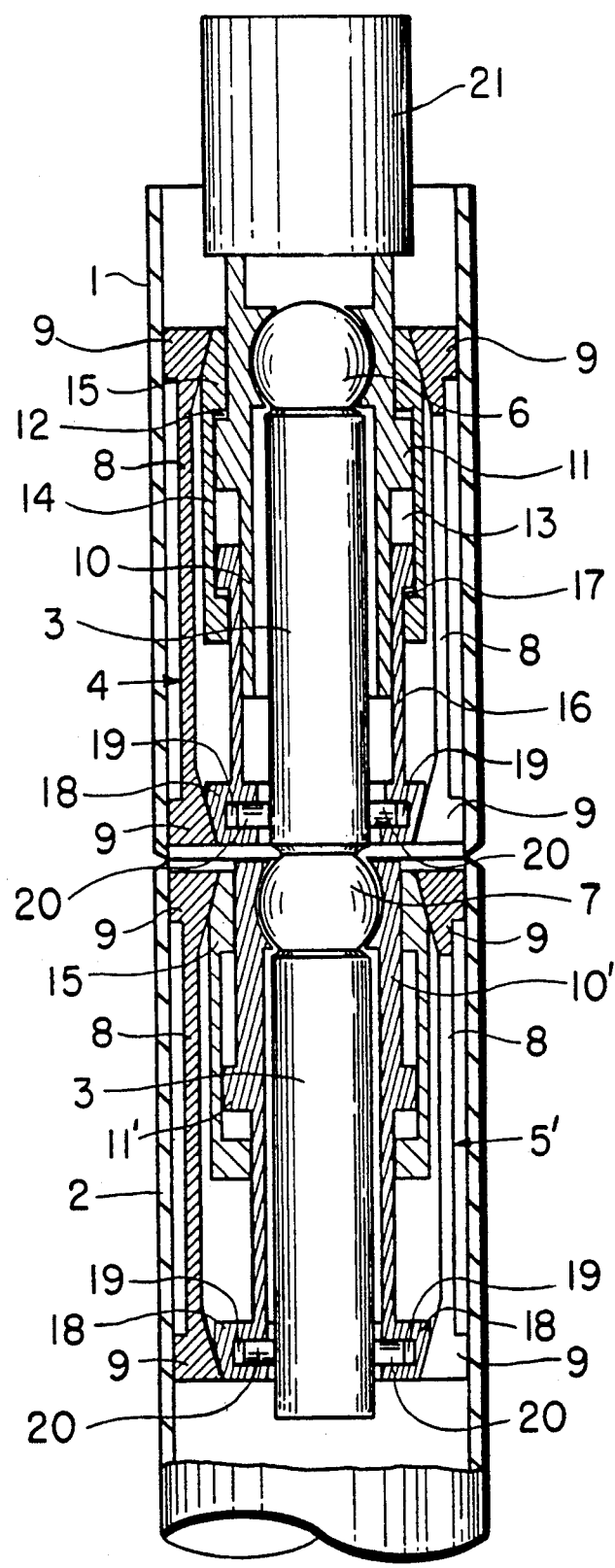
Figure 10:
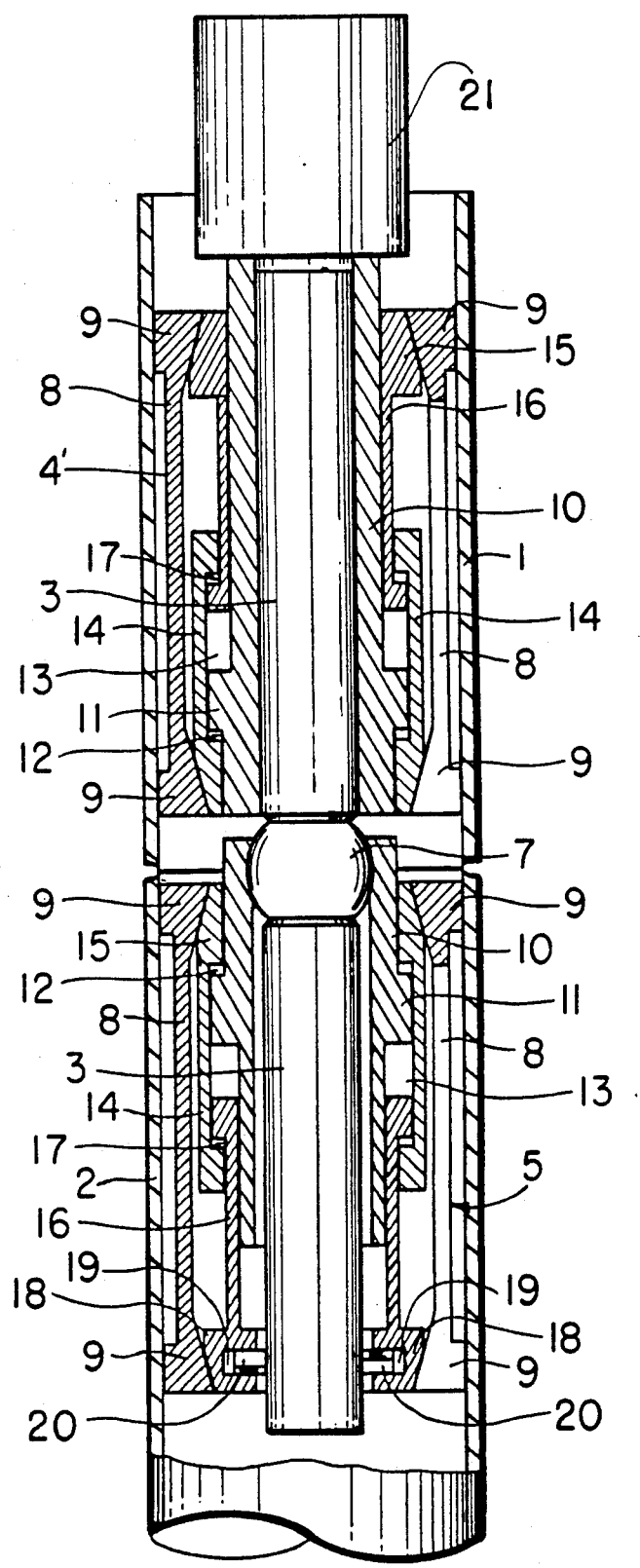

FIG. 9 is longitudinal sectional view of an alternative embodiment of centering device as shown in FIG. 8, one mandrel of which does not permit of axial displacement of the tube which is clamped to it, and FIG. 10 is a longitudinal sectional view of a further embodiment of centering device according to the invention in which only one of the hollow mandrels is articulated on the central supporting body.

With reference to the drawings in which corresponding elements are identified by the same reference numeral, reference numerals 1 and 2 respectively indicate the two tubes which have to be connected at their ends by means of the internal centering device according to the invention, constituted by a central supporting body 3 of mainly axial development, on which are fitted two hollow mandrels respectively 4 and 5 which are perfectly identical and which are fitted onto the said central body 3. The said hollow mandrels 4 and 5 are disposed symmetrically with each other (see specifically FIGS. 1 and 2) on the said central body 3 and are articulated at the ends of this latter respectively by means of joints 6 and 7. Each hollow mandrel 4 or 5 is then constituted by an outer flexible sleeve 8 which is elasticised by sleeve springs as clearly shown in FIG. 1, which is provided at the ends with claws 9 for radial clamping against the inside wall of the tube and adapted for radial expansion by an internal axial actuator which is hydraulic and which has two opposing threads, consisting of a hollow body 10 with one end articulated on the said joint 6 or 7 and having an annular projection 11 which defines two annular actuating chambers, respectively 12 and 13, with an annular jacket 14 which is supported so that it can slide axially on the said hollow body 10 and having wedge-shaped expansion heads 15. The said annular chamber 13 is furthermore also defined by a hollow stem 16 which is also adapted to slide axially, being disposed concentrically inside the jacket 14 with which it defines the annular actuating chamber 17, said stem also being supported by said hollow body 10 and having at its end which is outside the annular jacket 14 wedge-shaped expansion heads 18 and the actuating chambers 19 for a series of at least three radial actuators 20 which are caused to act between the central body 3 and the said stem 16.

The sequence and manner of operation of such an internal centering device is as follows.

Figure 2:
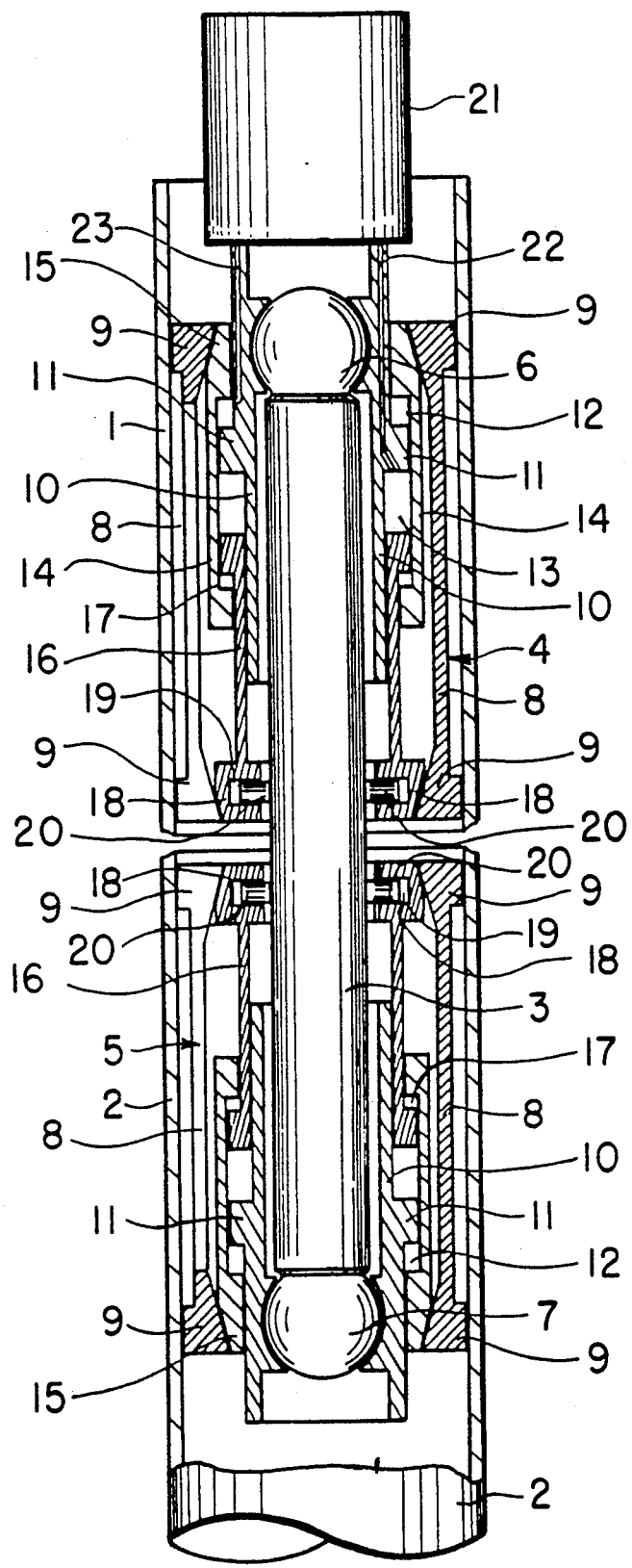
FIG. 2 shows a longitudinal section through the centering device in FIG. 1.
Figure 3:
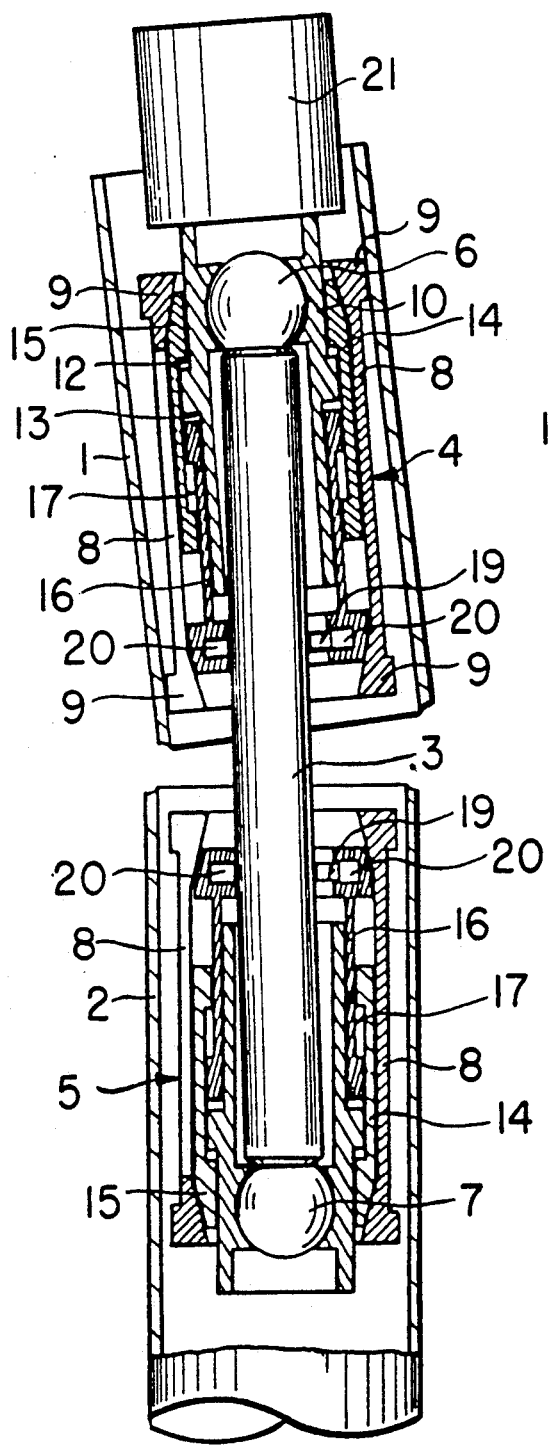
FIGS. 3 to 6 show in sequence the principle phases of operation of the internal centering according to the invention, viz.
Figure 4:
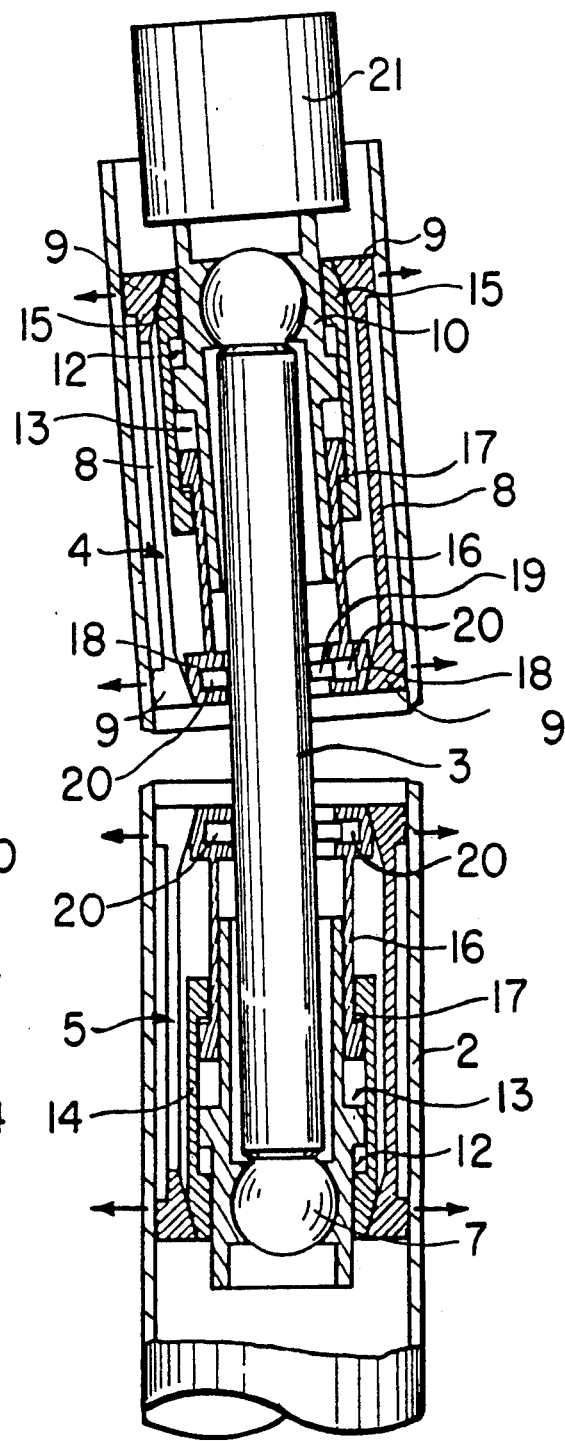
Figure 5:
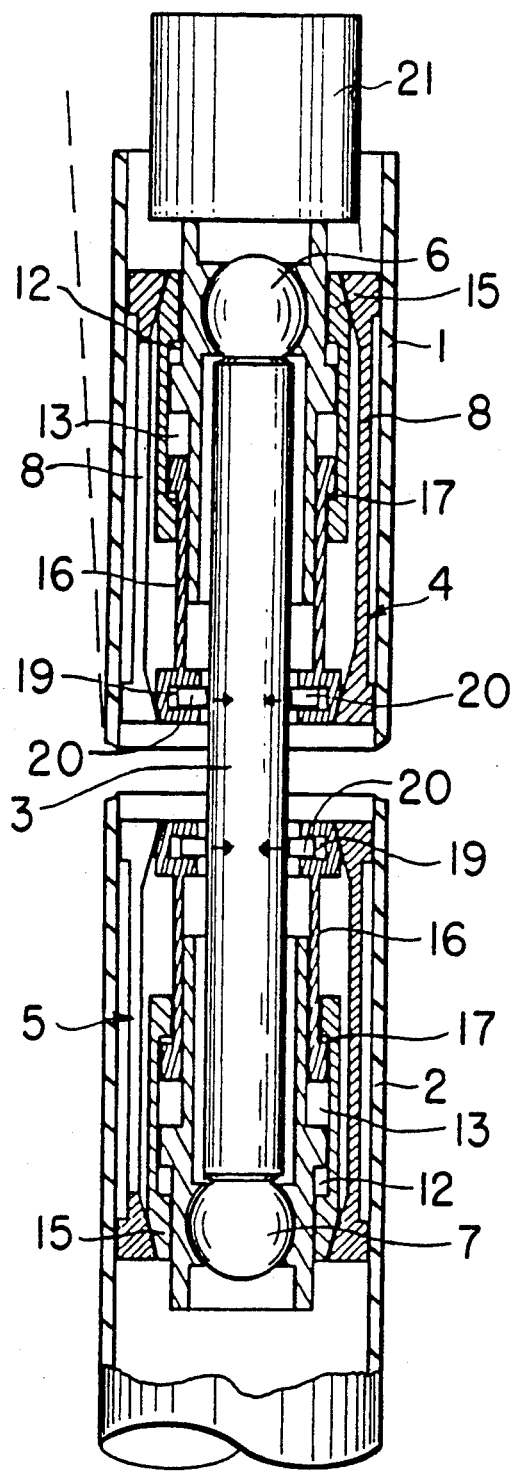
Figure 6:
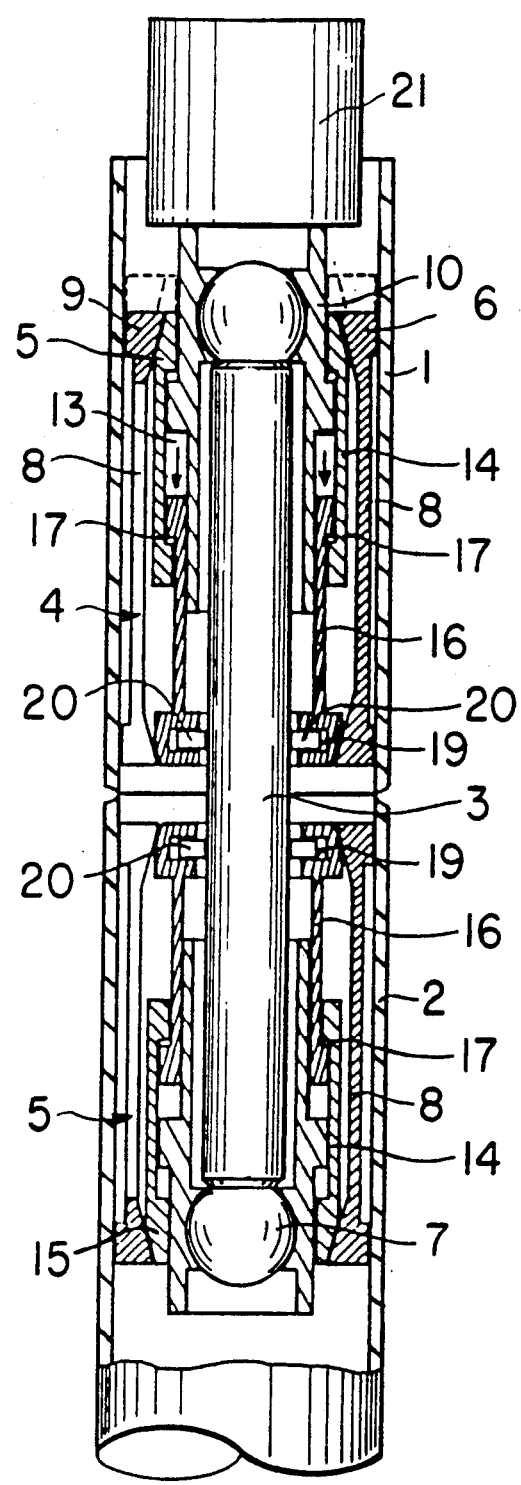

Once fitted in the tubes 1 and 2, the centering device is locked in position so that each mandrel 4 and 5 is able to clamp a single tube (see FIG. 3). Then from the hydraulic central unit 21 and through suitable pipes such as 22 and 23 shown in FIGS. 1 and 2, pressurised fluid is supplied to the annular chambers 12 and 13 causing them to move by virtue of the two opposing threads on the annular jacket 14 and the hollow stem 16, on which the wedge-shaped expansion heads 15 and 18 thus force the claws 9 on the flexible sleeves 8 of the mandrels 4 and 5 to be applied against the inner surface of the tubes 1 and 2 (see FIG. 4). After having correctly clamped the tubes, known means are used to raise the abutting edges of the tubes 1 and 2 to define the successive actions needed for them to assume the required shape and for them to be juxtaposed so that they can be connected. In particular, the radial actuators 20 are used for this purpose, with pressurised fluid in the chamber 19 causing alignment of one tube in respect of the other, acting on four degrees of freedom: two rotations and two transverse displacements (see FIG. 5). The positioning is then completed by the relative axial displacement of the tubes which is carried out with a variation in the fluid in the chambers 12 and 13 until the edges of the tubes themselves (see FIG. 6) are abutting. After connection or whenever is opportune, the mandrels 4 and 5 are finally released by reducing the pressure in the aforesaid chambers while supplying pressure on the other hand to the annular chambers 17 between the hollow stems and the annular jackets 14.

Figure 1:
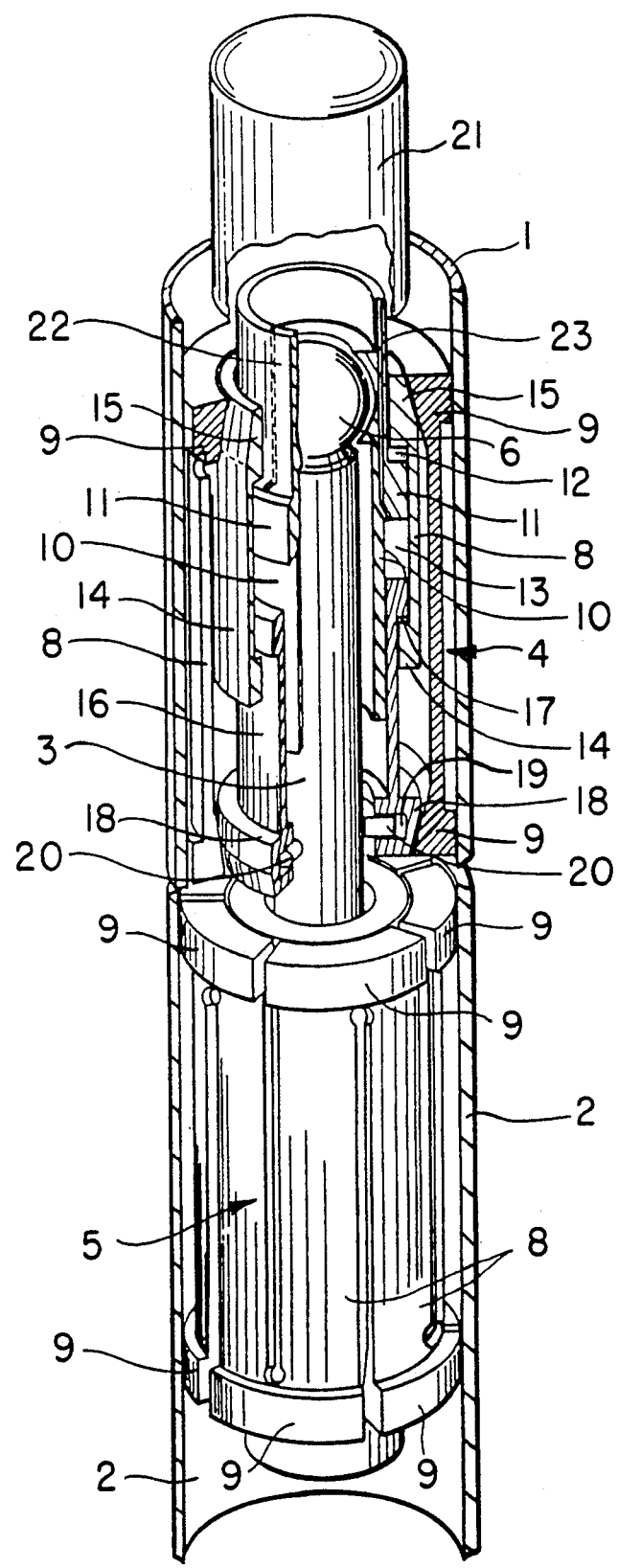
FIG. 1 is a partially sectional perspective view of an internal centering device produced according to the invention in the connection of the ends of two tubes.
Figure 7:
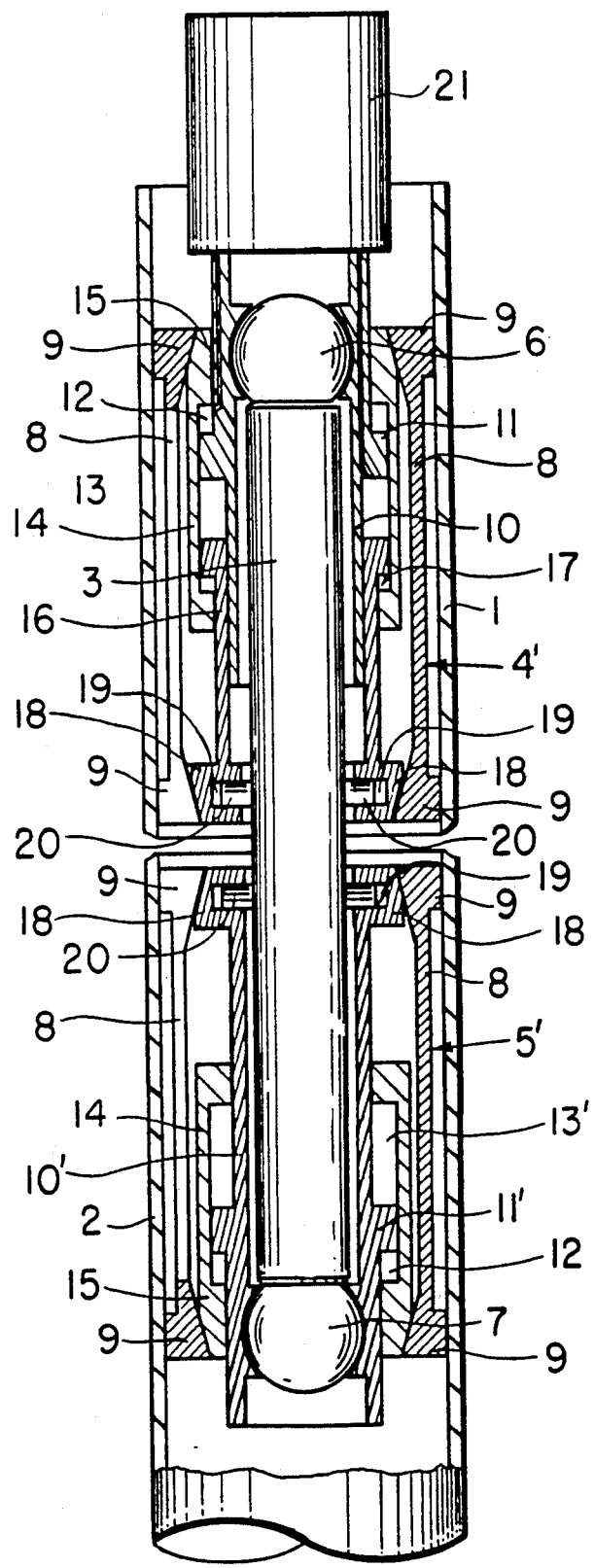
FIG. 7 is a longitudinal section through an alternative embodiment of the centering device according to the invention, as shown in FIG. 1, one mandrel of which does not permit of axial displacement of the tube which is clamped to it.

FIG. 7 illustrates an internal centering device which is substantially identical to that in FIG. 1 except that one of its two mandrels, identified as 5', does not permit of axial displacement of the tube 2 which is clamped to it. This represents the simplification that the said hollow body 10' articulated at 7 on the central supporting body 3 is itself extended to the position of the said hollow stem 16 and ends at the wedge-shaped expansion heads 18. In this way, the annular jacket 14 defines only two annular actuating chambers, 12 and 13' respectively.

The internal centering device in FIG. 8 differs from that in FIGS. 1 or 2 solely by virtue of the fact that the said hollow mandrels 4 and 5 are articulated on the central supporting body 3 in a serial rather than a symmetrical disposition of the actual mandrels.

The internal centering device shown in FIG. 9 is then similar to that in FIG. 8 except that use is made of one mandrel 5' which does not permit of axial displacement and therefore has the simplification already provided for by the centering device in FIG. 7.

Finally, FIG. 10 shows an internal centering device having one single mandrel 5 articulated on the central line about the central supporting body 3. Not being articulated, the other mandrel 4' obviously has no need of radial actuators but for the rest it is structurally identical to the first one.

We claim:

1. An internal centering device which is particularly adapted for connecting the ends of tubes, having a central supporting body with at least one articulation joint as well as expansion means for radially clamping the device against the inside walls of the tubes to be connected, comprising two axially oriented hollow mandrels, at least one of which is axially movable, mounted on the central supporting body, which body is disposed within said mandrels and in general axial alignment therewith, wherein at least one of said mandrels is articulated on the central supporting body articulation joint, at least three radial actuators spaced from the articulation joint for angular positioning of one of said mandrels relative to the central supporting body, an outer resilient sleeve on each of said mandrels and in which each of said sleeves can be expanded radially, and an internal hydraulic axial actuator for expanding said outer sleeves, and in which said internal hydraulic axial actuator further has opposing threads for the axially movable mandrel, each of said mandrels having a hollow body articulated at a respective articulation joint on the central body and an annular projection formed on each of said mandrels near the respective articulation joints, which each define respective annular actuating chambers with an annular jacket supported to slide axially on said hollow body, wedge-shaped expansion heads disposed at an end of at least one of said mandrels close to the articulation joint of said hollow body, a hollow stem forming the second of said annular actuating chambers for axial movement, said stem being disposed concentrically within said jacket to form a third annular actuating chamber, said stem being itself supported by said hollow body, and wedge-shaped expansion heads at an end of said stem which emerges from said annular jacket.

2. An internal centering device which is particularly adapted for connecting the ends of tubes, having a central supporting body with at least one articulation joint as well as expansion means for radially clamping the device against the inside walls of the tubes to be connected, comprising two axially oriented hollow mandrels, at least one of which is axially mounted on the central supporting body, which body is disposed within said mandrels and in general axial alignment therewith, wherein at least one of said mandrels is articulated on the central supporting body articulation joint, at least three radial actuators spaced from the articulation joint for annular positioning of one of said mandrels relative to the central supporting body, an outer resilient sleeve on each of said mandrels and in which each of said sleeves can be expanded radially, and an internal hydraulic axial actuator for expanding said outer sleeves, and in which one of said mandrels is axially immovable relative to the tube associated therewith and in which said internal hydraulic axial actuator with opposing threads and said hollow body is articulated at one end of said central supporting body, further having at the other end of said hollow body wedge shaped expansion heads, and annular projection protruding from said hollow body to establish two annular actuating chambers, an annular jacket which is supported in such a way that it can slide axially on said hollow body, and wedge-shaped expansion heads on the end of said annular jacket which is close to the articulation joint of the central supporting body.

3. An internal centering device according to claim 1 wherein said resilient sleeves of said hollow mandrel further comprises sleeve springs for providing resiliency.

4. An internal centering device according to claim 1 wherein said resilient sleeves of the hollow mandrels further comprises leaf springs for providing resiliency.

* * * * *